United States Patent [19]
Comer, Jr. et al.

[11] 3,851,721
[45] Dec. 3, 1974

[54] SUPPLEMENTAL FLUID SUPPLY

[75] Inventors: Glen S. Comer, Jr., Peoria; John R. Cryder; John B. Waggoner, both of Joliet, all of Ill.

[73] Assignee: Caterpillar Tractor Co., Peoria, Ill.

[22] Filed: Mar. 29, 1973

[21] Appl. No.: 345,952

[52] U.S. Cl............................ 180/79.2 R, 60/405
[51] Int. Cl............................................ B62d 5/04
[58] Field of Search .................. 180/79.2 R, 79.2 B; 60/405; 417/315, 217

[56] References Cited
UNITED STATES PATENTS

| | | | |
|---|---|---|---|
| 3,631,937 | 1/1972 | Joyce | 180/79.2 B |
| 3,653,209 | 4/1972 | McDuff | 60/405 |
| 3,719,249 | 3/1973 | Becker et al. | 180/79.2 R |

*Primary Examiner*—David Schonberg
*Assistant Examiner*—John A. Pekar
*Attorney, Agent, or Firm*—Phillips, Moore, Weissenberger, Lempio & Strabala

[57] ABSTRACT

There is disclosed means to provide a supplemental supply of fluid under pressure for emergency use in the hydraulic system of a vehicle with a normal supply provided by an engine driven pump. Pressure for the supplemental system is provided by a simple system including wheel driven pump which is operative during forward movement of the vehicle thereby insuring hydraulic control in emergency situations such as engine and/or engine driven pump failure. During reverse movement of the vehicle, simple pressure valves prevent flow from the main system into the supplemental system but allow reverse circulation of fluid through the wheel driven pump, thereby preventing cavitation.

3 Claims, 1 Drawing Figure

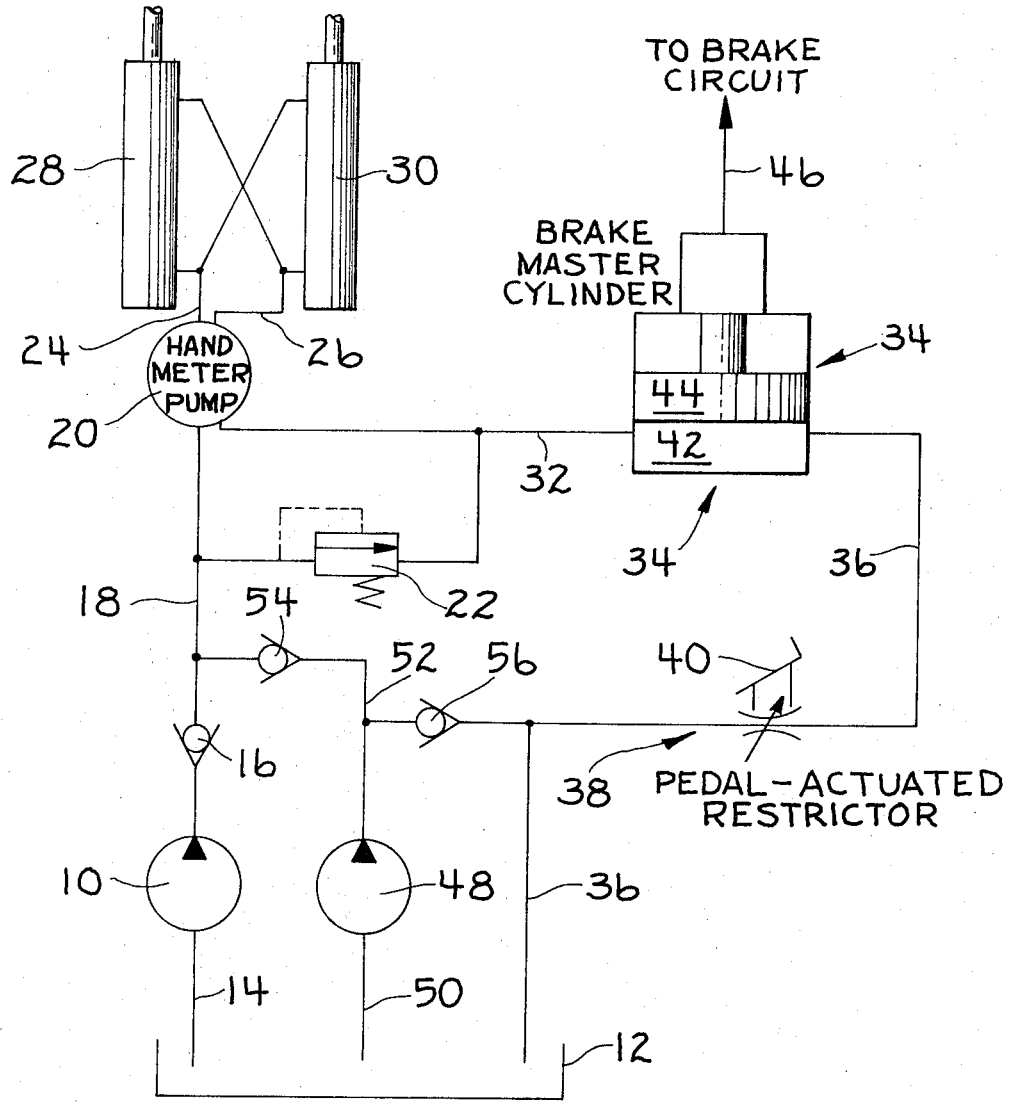

SUPPLEMENTAL FLUID SUPPLY

BACKGROUND OF THE INVENTION

The present invention relates to a means for providing supplemental fluid to the hydraulic system of a vehicle and pertains more particularly to a means for providing supplemental fluid to the steering and/or braking portions of a hydraulic system where loss of hydraulic flow could be dangerous.

Heavy motor vehicles often employ hydraulic means to provide steering and braking functions for the machine. Under emergency conditions, however, failure of the engine driven pump supplying fluid to the hydraulic system or vehicle engine stoppage can cause loss of steering and/or loss of braking control of the machine. Loss of braking control can often be compensated for by a parking or service brake operating directly on the drive line. However, loss of steering control can make steering of the vehicle very difficult or impossible.

In the prior art systems, this disadvantage of hydraulic steering systems was solved by utilizing an engine driven pump as the primary fluid supply pump and employing an auxiliary wheel driven pump as the secondary fluid pump, so that power assist remained available after the primary pump ceased to operate. These systems, however, require complicated circuits and switching or transfer valves incorporating a sensing device to connect the primary pump to the system when the engine is running. When there is loss of pressure in the primary system due to engine stoppage the valve switches the auxiliary wheel driven pump into the system. These switching valves have met with success; however, because of their complicated structure, and resulting high cost, they are often rejected by industry for use on less expensive vehicles. The switching valve and hydraulic connection of the auxiliary pump into the main system are also complicated by the need for auxiliary fluid supply during reverse movement of the vehicle.

The prior art is exemplified by the following U.S. Pats.: No. 2,898,737 issued Aug. 11, 1959 to Rockwell; No. 2,954,671 issued Oct. 4, 1960 to Kress, No. 3,065,810 issued Nov. 27, 1962 to Chambers et al., No. 3,154,921 issued Nov. 3, 1954 to Junck, No. 3,280,557 issued Oct. 25, 1966 to Sattavara, No. 3,407,894 issued Oct. 29, 1968 to Thompson et al., No. 3,242,262 issued Jan. 28, 1969 to Kunz, and No. 3,613,818 issued Oct. 19, 1971 to Shubert.

SUMMARY OF THE INVENTION

It is the primary object of the present invention to provide a system for overcoming the previously described deficiencies of the prior art.

Another object of the present invention is to provide a supplemental fluid supply system for emergency use in the hydraulic system of a vehicle in case of engine and/or engine drawn pump failure.

A further object of the present invention is to provide a supplemental fluid supply system incorporating a simple, low cost check valve that can be installed on vehicles not requiring auxiliary fluid supply during reverse operation of the vehicle.

A still further object of the present invention is to provide a supplemental fluid supply system having means to prevent the pump providing supplemental flow from cavitating when operated in the reverse direction.

In accordance with the present invention there is provided means for supplying auxiliary fluid to the hydraulic system of a vehicle with a normal supply provided by an engine driven pump. The auxiliary fluid supply is provided by a wheel driven pump which is operative during forward movement of the vehicle to insure control in emergency situations such as engine failure. During reverse movement of the vehicle, flow through the wheel driven pump is reversed to prevent pump cavitation. Under these circumstances, fluid enters the pump from the tank and the output is directed back to the tank.

BRIEF DESCRIPTION OF THE INVENTION

The above and other objects and advantages of the present invention will become apparent from the following description and accompanying drawing wherein:

The FIGURE is a schematic diagram of a hydraulic control system embodying the principles of the present invention.

DETAILED DESCRIPTION OF THE PREFERRED EMBODIMENTS

Referring now to the FIGURE, an engine driven pump of a vehicle control system is illustrated at 10 as arranged to withdraw hydraulic fluid from a tank 12 through a line 14 and to direct it through a check valve 16 and a line 18 to a steering valve 20 often referred to as a metering valve and a relief valve 22. The steering valve 20 may be any one of a number of conventional, commercially available valves. It serves to direct fluid through line 24 to the rod and head ends respectively of steering cylinders 28 and 30. When adjusted in the opposite direction, fluid pressure is directed through line 26 to the opposite ends of the same cylinders, line 24 serving as a return line in one case and line 26 in the other case, venting fluid through line 32 and directing it to a conventional brake master cylinder 34. The relief valve 22 insures adequate fluid pressure in line 18 for operation of the steering cylinders 28 and 30.

When the steering valve 20 is not supplying or venting fluid, all fluid is directed through relief valve 22 and line 32 to the brake master cylinder 34. The fluid is returned to the tank 12 from the master cylinder 34 through line 36 which includes a variable restriction 38 operated by a conventional foot brake pedal 40. Depressing pedal 40 closes restriction 38 proportionately to the movement of the brake pedal, which in turn causes a pressure rise in chamber 42 of master cylinder 34 to actuate piston 44 to pump brake fluid into line 46 which directs the fluid to the braking system.

A second pump 48, which is wheel driven, is arranged to withdraw fluid from tank 12 through line 50 and direct it through line 52 and check valve 54 to line 18 where it combines with the flow from pump 10. The second pump 48 is coupled by any suitable means such as a gearing to a drive line or driven axle of the vehicle, so that when the vehicle is driven in the forward direction the output from pump 48 will combine with the output from pump 10 as previously explained so long as the pressure head of pump 48 is great enough to overcome the check valve 54.

Valve 54 serves to prevent loss of flow from pump 10 in case of pump 48 or line 52 failure and check valve 16 prevents loss of flow from pump 48 in case of pump 10 or line 14 failure.

When the vehicle is driven in the reverse direction, line 52 becomes an inlet line to pump 48, but since flow cannot pass in this direction through check valve 54, a second check valve 56 is connected between line 52 and line 36 so that fluid can be drawn into pump 48 from tank 12 through line 36, check valve 56, and line 52. Output from pump 48 under these conditions is directed through line 50 to tank 12. This arrangement prevents cavitation in pump 48 and may be referred to as an anti-cavitation circuit.

From the above description, it is seen that there is provided a simple and inexpensive supplemental fluid supply system for providing auxiliary fluid to the hydraulic system of a vehicle with a normal supply provided by an engine driven pump. Pressure for the supplemental system is derived from a wheel driven pump, operative during forward movement of the vehicle to insure control during engine failure. Anticavitation means are operative during reverse movement of the vehicle to prevent cavitation in the wheel driven pump.

What is claimed is:

1. In a hydraulic fluid supply system for a vehicle control system having an engine driven pump normally providing fluid under pressure for operation of a hydraulic steering mechanism and a hydraulic braking mechanism, the improvement comprising:
   said steering mechanism being upstream of said braking mechanism in said control system;
   a wheel driven pump;
   conduit means communicating said wheel driven pump to direct fluid under pressure into said supply system during forward operation only of said vehicle; and
   anti-cavitation means including conduit means connected to the output of said wheel driven pump and communicating with sump and a pressure responsive check valve operative to permit circulation of said fluid through said wheel driven pump during reverse operation of said vehicle, whereby cavitation in said wheel driven pump is prevented.

2. The hydraulic fluid supply system of claim 1 wherein said steering mechanism has priority over said brake mechanism in said circuit, with fluid exhausted from said steering mechanism going to said brake mechanism for operation thereof; and
   a relief valve connected in said supply system for bypassing fluid to said brake mechanism during non-operation of said steering mechanism.

3. The hydraulic fluid supply system of claim 2 wherein said brake mechanism includes a piston in open communication with said fluid system for operation by pressurized fluid therein; and
   said fluid for operation of said piston is pressurized by a restriction valve downstream of said piston.

* * * * *